US011208342B2

(12) United States Patent
Orazem et al.

(10) Patent No.: US 11,208,342 B2
(45) Date of Patent: *Dec. 28, 2021

(54) DEVICE FOR EFFICIENT CONTINUOUS ELECTROKINETIC DEWATERING OF PHOSPHATIC CLAY SUSPENSIONS

(71) Applicant: University of Florida Research Foundation, Inc., Gainesville, FL (US)

(72) Inventors: Mark E. Orazem, Gainesville, FL (US); Arthur R. Dizon, Jacksonville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/173,184

(22) Filed: Oct. 29, 2018

(65) Prior Publication Data

US 2019/0127256 A1    May 2, 2019
US 2021/0206682 A9    Jul. 8, 2021

Related U.S. Application Data

(63) Continuation-in-part of application No. 15/516,989, filed as application No. PCT/US2015/053998 on Oct. 5, 2015, now Pat. No. 10,315,165.
(Continued)

(51) Int. Cl.
*C02F 11/12* (2019.01)
*C02F 11/00* (2006.01)
(Continued)

(52) U.S. Cl.
CPC ............ *C02F 11/12* (2013.01); *B01D 21/009* (2013.01); *C02F 11/006* (2013.01);
(Continued)

(58) Field of Classification Search
CPC ........ B01D 33/04; B01D 35/06; B01D 61/42; B01D 61/56; B03C 5/00; B03C 5/02; C02F 11/12
See application file for complete search history.

(56) References Cited

U.S. PATENT DOCUMENTS

| 3,962,069 A * | 6/1976 | Inoue | B01D 33/04 204/649 |
| 4,376,022 A * | 3/1983 | Porta | B01D 61/56 204/516 |
| 4,680,104 A * | 7/1987 | Kunkle | B01D 33/042 204/629 |

FOREIGN PATENT DOCUMENTS

WO    WO-2016057392 A1 *    4/2016    ............ C02F 11/006

* cited by examiner

*Primary Examiner* — Walter D. Griffin
*Assistant Examiner* — Cameron J Allen
(74) *Attorney, Agent, or Firm* — Thomas | Horstemeyer, LLP

(57) ABSTRACT

Various examples related to electrokinetic dewatering (EKD) of suspensions such as, e.g., phosphatic clay suspensions are provided. In one example, a system for continuous EKD includes cake dewatering unit having a lower conveying belt extending across a dewatering chamber; an upper conveying belt extending across at least a portion of the dewatering chamber; and a sludge inlet configured to supply a sludge suspension on the first end of the lower conveying belt. The conveying belts can extend across the dewatering chamber at an angle. Rotation of the conveying belts draws the sludge suspension through an electric field where the sludge suspension is dewatered. The electric field can be established between an upper anode and a lower cathode. The upper and lower conveying belts can include the anode
(Continued)

and cathode. A suspension thickening unit can provide a thickened sludge suspension the cake dewatering unit for enhanced dewatering.

20 Claims, 15 Drawing Sheets

Related U.S. Application Data

(60) Provisional application No. 62/577,967, filed on Oct. 27, 2017, provisional application No. 62/143,303, filed on Apr. 6, 2015, provisional application No. 62/059,930, filed on Oct. 5, 2014.

(51) Int. Cl.
*B01D 21/00* (2006.01)
*C02F 11/123* (2019.01)
*C02F 11/15* (2019.01)
*C02F 101/10* (2006.01)
*C02F 103/04* (2006.01)
*C02F 103/12* (2006.01)
*C02F 103/10* (2006.01)

(52) U.S. Cl.
CPC ............ *C02F 11/123* (2013.01); *C02F 11/15* (2019.01); *C02F 2101/105* (2013.01); *C02F 2103/04* (2013.01); *C02F 2103/10* (2013.01); *C02F 2103/12* (2013.01); *C02F 2201/002* (2013.01); *C02F 2209/10* (2013.01); *C02F 2209/40* (2013.01)

| Single Unit | | | | Dual Unit | | | |
|---|---|---|---|---|---|---|---|
| Index | $w_{in}$ / wt.% | $w_c$ / wt.% | $E$ / V/cm | Index | $w_{in}$ / wt.% | $w_c$ / wt.% | $E$ / V/cm |
| a | 10 | 31 | 4.0 | q | 19 | 34 | 2.0 |
| b | 10 | 29 | 4.0 | r | 18 | 35 | 2.0 |
| c | 10 | 31 | 4.0 | s | 19 | 29 | 1.7 |
| d | 10 | 25 | 4.0 | t | 16 | 29 | 1.9 |
| e | 10 | 22 | 4.0 | | | | |
| f | 10 | 20 | 4.0 | | | | |
| g | 10 | 26 | 2.0 | | 2nd Unit | | |
| h | 10 | 26 | 2.0 | Index | $w_{in}$ / wt.% | $w_c$ / wt.% | $E$ / V/cm |
| i | 10 | 23 | 2.0 | u | 10 | 35 | 2.0 |
| j | 10 | 23 | 2.0 | v | 10 | 33 | 2.5 |
| k | 10 | 30 | 2.0 | w | 10 | 31 | 2.4 |
| l | 10 | 35 | 2.0 | x | 12 | 38 | 2.6 |
| m | 10 | 34 | 1.0 | y | 16 | 36 | 2.7 |
| n | 10 | 35 | 1.0 | | | | |
| o | 10 | 32 | 1.0 | | | | |
| p | 10 | 34 | 1.0 | | | | |

DEVICE FOR EFFICIENT CONTINUOUS ELECTROKINETIC DEWATERING OF PHOSPHATIC CLAY SUSPENSIONS

CROSS REFERENCE TO RELATED APPLICATIONS

This application claims priority to, and the benefit of, U.S. provisional application entitled "Device for Efficient Continuous Electrokinetic Dewatering of Phosphatic Clay Suspensions" having Ser. No. 62/577,967, filed Oct. 27, 2017, which is hereby incorporated by reference in its entirety. This application is a continuation-in-part of U.S. patent application Ser. No. 15/516,989, filed Apr. 5, 2017, now issued as U.S. Pat. No. 10,315,165, which is the National Stage Entry of PCT Application No. PCT/US15/53998, filed Oct. 5, 2015, published as WO 2016/057392, which claims priority to U.S. Provisional Application No. 62/143,303, filed Apr. 6, 2015, and U.S. Provisional Application No. 62/059,930, filed Oct. 5, 2014.

BACKGROUND

A dilute suspension of phosphatic clays is a waste product of phosphate ore beneficiation where the mineral is separated from the ore during processing. The waste clay suspensions, which can initially contain 3-5 wt % of solids, are pumped to large impoundment areas termed clay settling areas (CSAs) for consolidation. However, increase in the solids content proceeds very slowly. In some cases, settling and self-consolidation of the clay can take 25 years to reach a solids content of 25-40 wt %. In central Florida, CSAs cover over 150 square miles, which represents 30% of the mined land.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to electrokinetic dewatering of suspensions such as, e.g., phosphatic clay suspensions. An example of a device that continually dewaters phosphatic clay (e.g., phosphate mine tailings) through electrokinetic methods. Phosphatic clay suspensions with a solids content of 10 wt % can be continually fed between two belts that allow the clay suspension to come in contact with electrodes that apply an electric field. An expanded-metal anode can be placed on the top, and an expanded-metal cathode can be placed on the bottom, allowing clarified water to drain freely away from the phosphatic clay solids.

The device can produce a dewatered cake with a solids content of 31 to 38 wt % with a residence time of between 1.5 and 3 hours. The disclosed design exhibits surprising results with greatly improved efficiency, as compared to previous designs, allowing a 10-fold reduction in the needed electrode area. The reduction of electrode area is important because the anticipated cost of the operation is driven by capital costs that are scaled by the electrode area. This dewatering scheme can be used for dewatering of phosphate mine tailing. In addition, other mining operations that generate clay-rich suspensions include oil sands and other mineral processing involving use of floatation.

The disclosed continuous electrokinetic dewatering can eliminate the need for land for the long-term storage of phosphatic clay during current separation methods of gravity settling, which takes decades. It can also reduce the risk of dam failures in the long-term storage ponds called clay-settling areas. The recovered water can be recycled into the phosphate ore flotation process. The use of an electric field to cause separation does not require adding polymers to the clay such as is needed for a competitive process that uses flocculation by addition of polymers followed by gravity separation.

Electrokinetic dewatering (EKD) for industrial implementations is presented. The disclosed methods and systems can provide opportunities in reducing the industrial implementation cost of EKD such as, e.g., minimizing the applied potential, increasing throughput, and reducing the cost of construction while maintaining a sufficient solid content to ensure a pseudo-plastic clay cake. These options have been evaluated through the development, fabrication, and testing of various new EKD systems.

Figure 1:
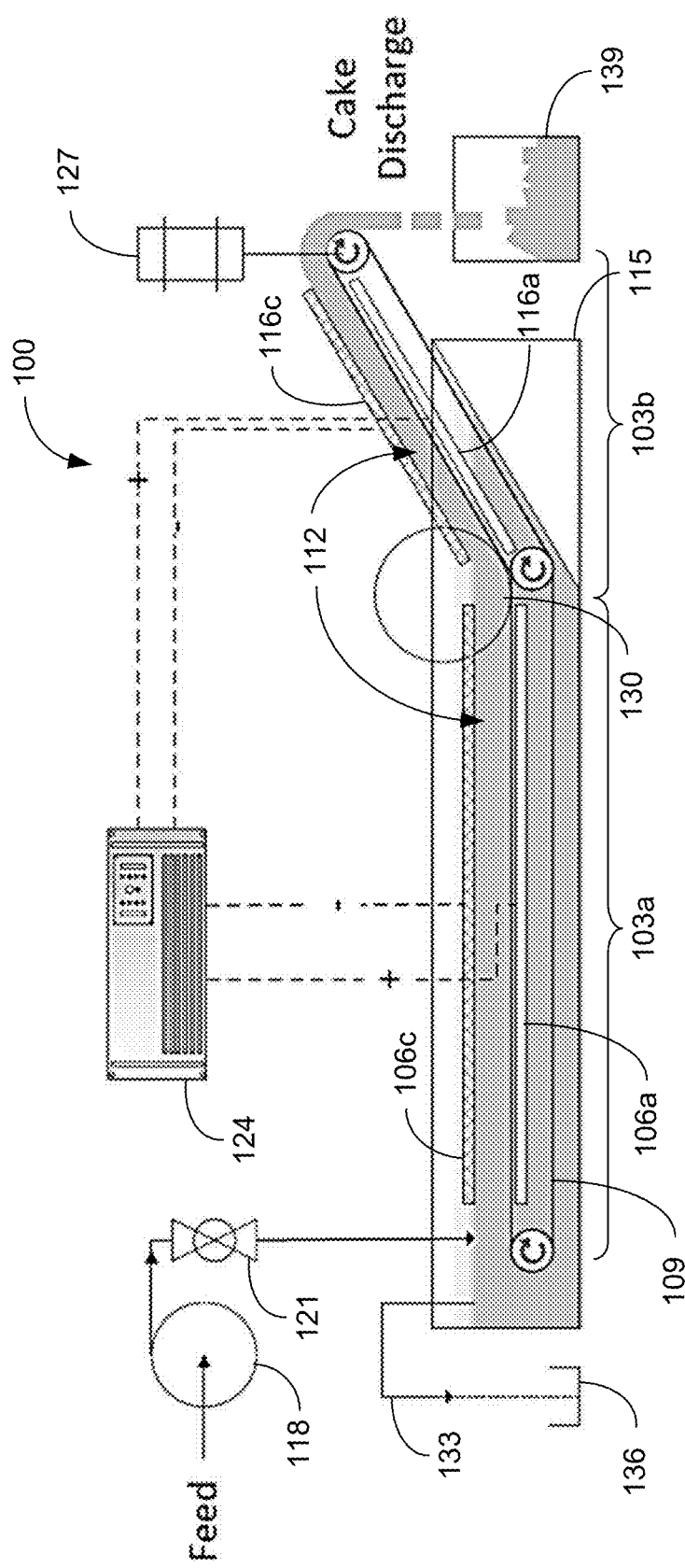
FIG. 1 is a graphical representation of an example of a continuous electrokinetic dewatering (EKD) system including a cake formation zone and a cake dewatering zone, in accordance with various embodiments of the present disclosure.

Referring to FIG. 1, shown is an example of a fully-continuous single-unit EDK system 100 comprising two zones that carry out the dewatering process: a cake formation zone 103a and a cake dewatering zone 103b. In each zone 103, a pair of electrodes 106 is positioned on either side of a rotating conveying belt 109. In the horizontal cake formation zone 103a, a cake 112 can be formed on the conveying belt 109 through electrophoresis. Under the influence of an electric field established between the cathode 106c and anode 106a, the dispersed particles in an influent will migrate toward the conveying belt 109, where they settle and form a layer of cake 112 on an upper portion of the conveying belt 109.

A dilute feed suspension is delivered to a separation chamber or basin 115 from, e.g., a supply tank or other feed system by a pump 118. For example, the horizontal basin 115 can be filled with a dilute phosphatic clay suspension. A metering valve 121 may be used to control the flow of the dilute feed suspension being supplied to the separation chamber or basin 115. In other implementations, the speed of the pump 118 may be controlled (e.g., by a variable speed drive) to control the suspension flow. The pump 118 and/or the metering valve 121 may be automatically controlled based upon indications from a flow measurement device.

Under an applied potential, clay particles can be collected on a non-conductive conveying belt 109 that passes between the two electrodes 106. The anode 106a and cathode 106c receive DC power from a power supply 124 such as, e.g., a potentiostat. As the clay cake 112 is formed on the horizontal section of the conveying belt 109, the cake 112 is lifted out of the basin 115 onto an inclined section of the conveying belt 109. The conveying belt can be driven forward by an electric motor 127 (e.g., a stepper motor) to move the layer of cake 112 from the cake formation zone 103a to the cake dewatering zone 103b.

The transition of the conveying belt 109 from horizontal to inclined can be facilitated using, e.g., wheels or discs 130 distributed across the width of the conveying belt 109. The inclined section provides the cake dewatering. A second pair of electrodes (anode 116a and cathode 116c) can be used to continue dewatering the cake 112, removing supernatant water that cascades in a counter-current fashion back into the basin 115. The electrodes 106 and/or 116 can be made of iridium-oxide ($IrO_2$) coated titanium or other appropriate corrosion resistant metal in order to minimize electrode corrosion during dewatering. The supernatant liquid 133 can be collected in an overflow weir 136, and the dewatered clay cake 112 can be collected in a bin 139 or other receptacle at the end of the inclined conveying belt 109. Additional details regarding the continuous EDK system comprising a cake formation zone and a cake dewatering zone are provided in PCT application entitled "Continuous Electrokinetic Dewatering of Phosphatic Clay Suspensions" by Orazem et al., International Pub. No. WO 2016/057392, published 14 Apr. 2016, which is hereby incorporated by reference in its entirety.

Figure 2:
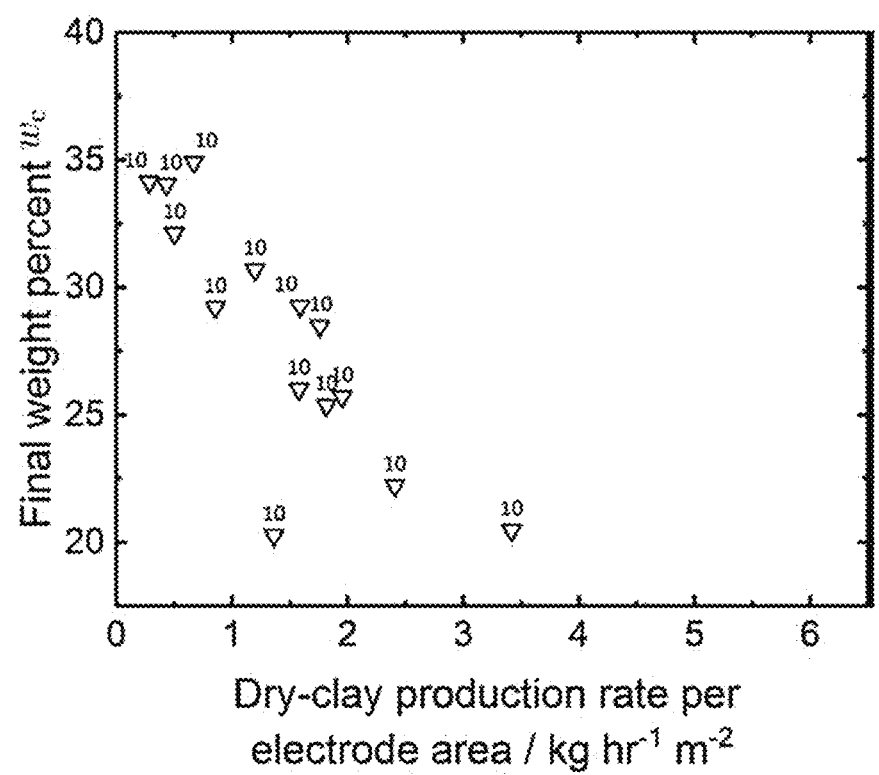
FIG. 2 illustrates the final solids content produced as a function of the dry-clay production rate per area of electrode using the continuous EKD system of FIG. 1, in accordance with various embodiments of the present disclosure.

The single-unit design with separate clay formation and dewatering zones was able to produce clay in excess of 30 wt %, but this was at the expense of throughput. FIG. 2 illustrates the final solids content produced as a function of the dry-clay production rate per area of electrode using the single-unit design of FIG. 1. The data points are labeled with the feed solids content. The operation of the single-unit continuous EKD system of FIG. 1 shows a linear decrease in dry-clay production rate per unit area of electrode as the final solids content $w_c$, is increased. The movement of dewatered clay was impeded by drag from the transfer between the horizontal section and inclined section and drag from the direct contact with floating cathode.

In order to decrease the capital cost associated with continuous electrokinetic dewatering, throughput may be increased by separating the clay formation and clay dewatering zones into two units: a suspension (or clay) thickening unit and a cake dewatering unit, thereby eliminating the rehydration of the clay. The separation into two unit operations allows for independent mechanism-specific optimization of the zones and reduced rewetting of the separated solids, which can further improve the throughput and efficiency of the EKD. Drag between the clay and the electrodes can be reduced by using two conveying belts that sandwich and transport the clay between the electrodes. In other implementations, a single-stage unit can be used to perform the thickening and dewatering operations in a single cake dewatering unit as will be discussed.

Thickening Unit

Figure 3:
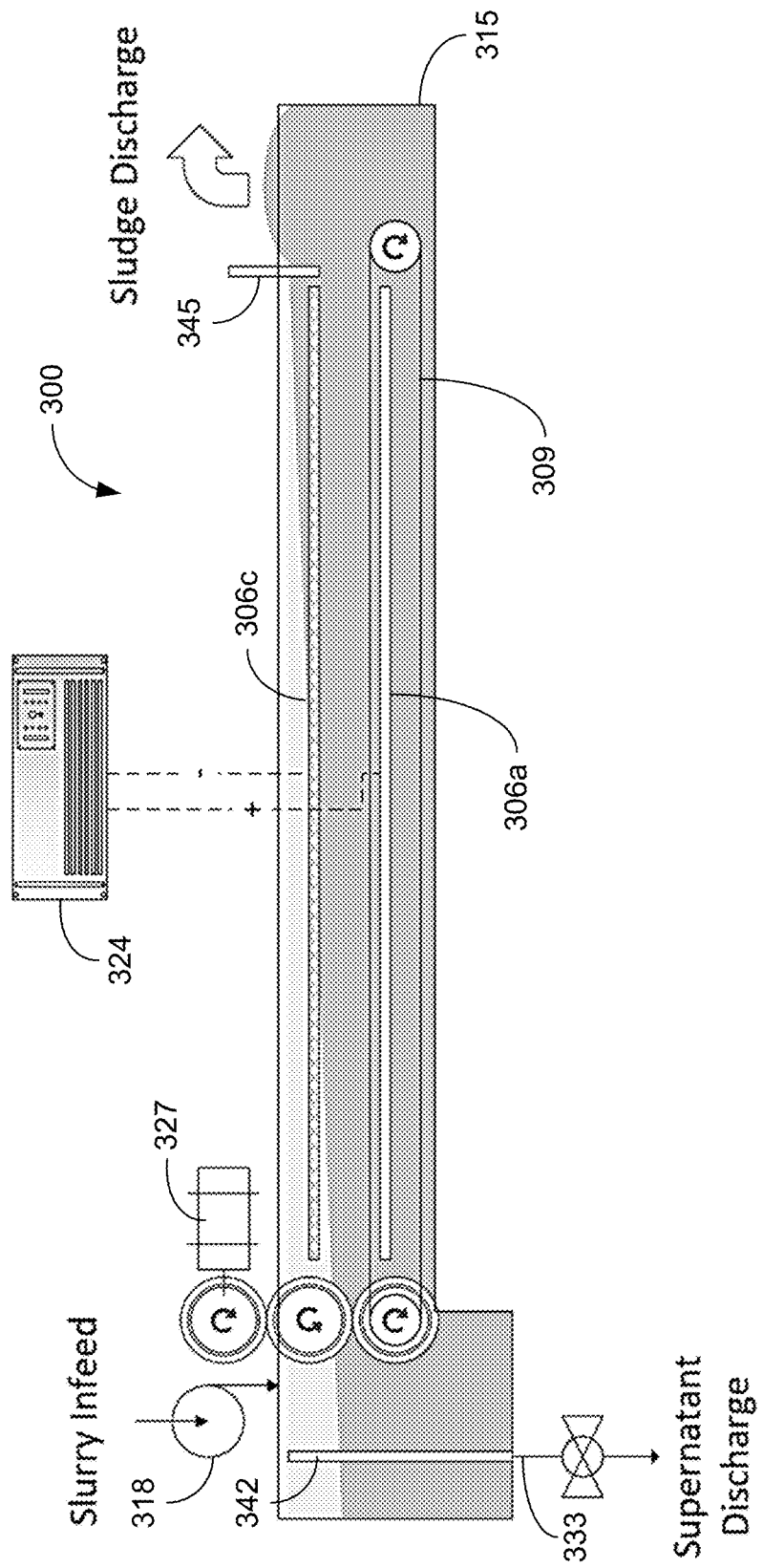
FIG. 3 is a graphical representation of an example of a suspension (or clay) thickening unit, in accordance with various embodiments of the present disclosure.

The suspension (or clay) thickening unit can be to produce a thickened sludge from the dilute feed. The thickened sludge suspension produced can be collected and transferred to the dewatering unit for further processing. For the most effective operation, the sludge production rate should be sufficiently high to supply the dewatering unit. FIG. 3 is a graphical representation of an example of a suspension (or clay) thickening unit 300. As in the continuous two-stage EKD system of FIG. 1, a dilute feed suspension can be delivered to a separation chamber or basin 315 from, e.g., a supply tank or other feed system by a pump 318. The pump 318 and/or a metering valve may be automatically controlled based upon indications from a flow measurement device.

In the separation chamber 315, an anode 306a is positioned below a cathode 306c. For instance, the distance between the anode 306a and cathode 306c may be in the range of about 5 cm to about 10 cm, however the distance between the anode 306a and cathode 306c may varied outside of this range. In the example of FIG. 3, the anode 306a and cathode 306c extend between a first end of the separation chamber 315, where the dilute feed suspension is delivered, to a second end of the separation chamber 315, where the thickened solids-rich sludge is discharged, e.g., over a wall of the separation chamber 315. With the electrodes 306 energized by the power supply 324, the electrokinetic action causes the solids to consolidate settle in the separation chamber 315. As the dilute feed suspension flows from the first end to the second end of the separation chamber 315, supernatant water is separated from the solids. The separated supernatant water 333 may then be removed from the separation chamber 315 by an overflow 342 (e.g., a standpipe weir or other appropriate drain or discharge) in the separation chamber 315.

The anode 306a and cathode 306c receive DC power from a power supply 324 such as, e.g., a potentiostat. The cathode 306c may be positioned below and adjacent to the surface of the liquid (or dilute feed suspension) within the separation chamber 315, which can be maintained by the position of the overflow 342 within the separation chamber 315. The electrodes 306 may be metallic grids such as, e.g., dimensionally stable mesh electrodes made of titanium with an iridium oxide coating or other material suitable for the environment of the EKD system 300. The $IrO_2$ coated titanium cathode can, for example, be replaced by carbon steel cathodes. The anode 306a can be a solid plate.

The anode 306a can be positioned between the top and bottom portions of the conveying belt 309, and directly below the top portion of the belt. Under the influence of the constant electric field established between the cathode 306c and anode 306a, the dispersed particles in the influent will migrate toward the conveying belt 309, where they settle on an upper portion of the conveying belt 309. As the sludge is deposited on the conveying belt 309, it can be driven forward by an electric motor 327 (e.g., a stepper motor) through gearing or appropriate transmission system. As the thickened sludge is transported to the second end by the conveying belt 309, a dam or weir 345 extending across the separation chamber 315 allows the thickened sludge to build up and flow over the wall of the separation chamber 315 without flowing back onto the cathode 306c. In other implementations, a screw conveyor can be used to remove the thickened sludge from the second end of the separation chamber 315.

The electrodes 306 can be stationary with a moving conveying belt 309 as shown in FIG. 3. In alternative embodiments, one or both of the electrodes can be configured to move. For example, the conveying belt 309 can include the anode 306a. The anode 306a can be integrated in the conveying belt 309 allowing it to move with the thickening sludge as it is transported to the end of the thickening unit 300. Flexible metal wires, mesh or plates can be incorporated into the materials of the conveying belt 309. In some implementations, the anode 306a can be a flexible metal belt fabricated from, e.g., iridium oxide coated titanium or other appropriate corrosion resistant metal. The anode belt can be positioned within the conveying belt 309 such that it moves in a synchronized fashion adjacent to the portion of the conveying belt 309 next to the thickening sludge. A separate drive motor (e.g., a stepper motor) can be used to control movement of the anode belt, and one or more tensioners can be configured to maintain the anode belt in contact with the conveying belt 309 with a compressive force to maintain good contact for dewatering the sludge.

A suspension (or clay) thickening unit 300 was fabricated and tested for the production of a sludge from the dilute feed. The dilute feed clay suspension was feed at a first end of the thickening unit 300 of FIG. 3, and collection of solids-rich sludge was carried out at the send end. The conveying belt 309 transported the clay between the electrodes 306. Sludge collected on the conveying belt 309 accumulated at the second end of the separation chamber or basin 315. Both electrodes 306 were made of iridium-oxide-coated titanium and had dimensions of 63.5 cm by 38.1 cm. The bottom electrode was a solid plate that served as the anode. The top electrode was an expanded-metal mesh that served as the cathode. The electrode separation was 3.4 cm. The conveying belt 309 was made of a polyester mesh filter screen (Component Supply Company, Sparta, Tenn., USA, product number U-CMY-530) with a 530 μm mesh opening, 50% open area, and 220 μm thread size. The frame for the electrodes 306 and belt rollers was constructed from Delrin®. A standpipe weir 342 collected supernatant water that accumulated at the top of the suspension. The assembly containing the electrodes 306 and conveying belt 309 was placed in an acrylic tank used as the separation chamber or basin 315. The conveying belt 309 was driven with a stepper motor 327 (Automation Technology Inc. model KL23H2100-35-4BM) with a 60:1-reducing right-angle gearbox (Onedrives PF30-60NM), a driver (RTA Pavia CSD 92), and an arbitrary waveform generator (Aligent 33210A). The entire assembly was tilted by +2 degrees in the lateral axis to facilitate the escape of gas evolved by the submerged anode 306a.

The phosphatic clay suspension had an initial solids content of 4 wt %, and was left to gravity settle. The supernatant water was decanted, leaving behind 7.5 wt % clay that was used as feed for the thickening unit 300. In a typical experimental run of the thickening unit 300, the separation chamber or basin 315 was filled with the 7.5 wt % clay feed suspension. The electric field was activated, which caused clarified water to form at the top of the tank. The DC-power-supply potential ranged from 4.2 to 8.0 V, which, for a measured line resistance of 1.2Ω, corresponds to a working potential difference of 3.2 V to 5.0 V. The applied potential between the electrodes yielded electric fields between 1.0 and 1.5 V/cm for an electrode separation of 3.4 cm. Prior to activating the conveying belt 309, the suspension was allowed to dewater under the applied electric field for 1 hour. After the initial start-up period, the belt motor 327 and feed pumps 318 were activated which caused clarified water to flow towards the feed side of the unit into the standpipe weir 342. The belt speeds ranged from 0.5 to 1.7 cm/min. The feed volumetric flow rate ranged from 20 to 28 mL/min.

Figure 4:
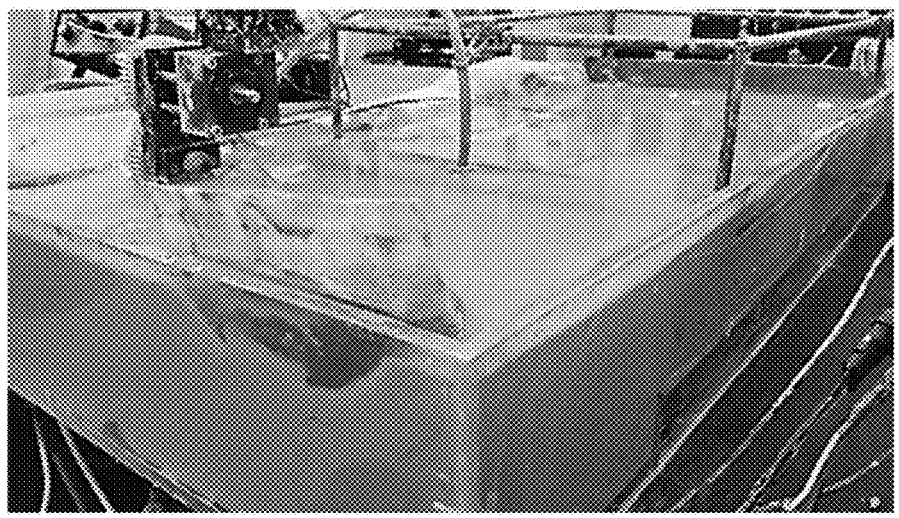
FIG. 4 is an image of the feed side of the thickening unit of FIG. 3 after the electric field and belts were activated, in accordance with various embodiments of the present disclosure.
Figure 5A:
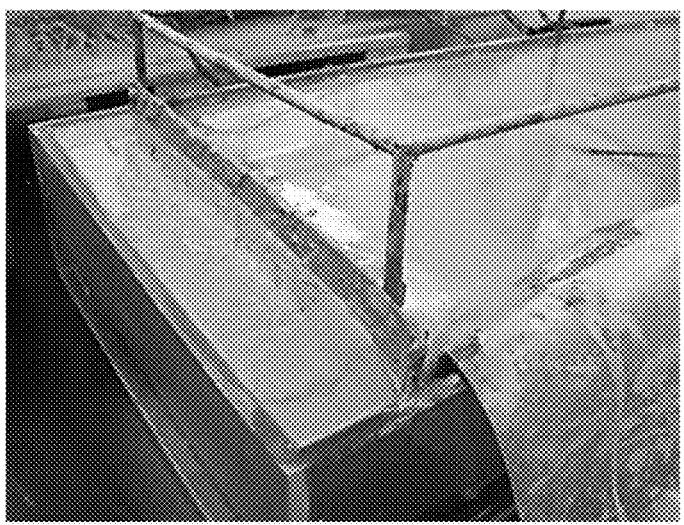
FIGS. 5A and 5B are images of the collection area of the thickening unit of FIG. 3, in accordance with various embodiments of the present disclosure.
Figure 5B:
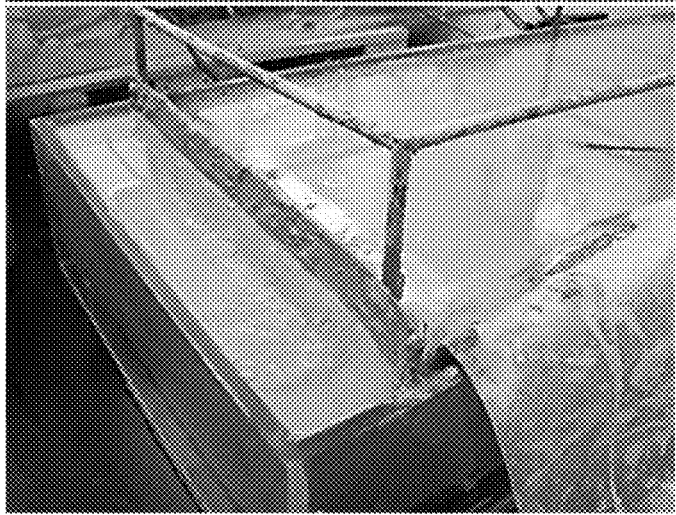

A visible one-inch-thick clear-water layer can be seen in the image of FIG. 4, which was taken after a steady state was reached. The supernatant water flowed to the feed side of the separation chamber 315 by displacement, due to sludge accumulation at the collection end of the separation chamber 315. FIG. 5A is an image showing the collection area of the clay thickening unit 300 with an accumulation of thickened sludge produced at an electric field of 1.2 V/cm, a feed rate of 20 mL/min, and a belt speed of 1.3 cm/min. The sludge was accumulated for approximately 30 minutes. While continuous removal of the thickened sludge is envisioned, a batch-wise removal of the thickened sludge was performed. FIG. 5B is an image showing the collection area of the thickening unit 300 just after batch-wise collection of the thickened sludge. The sludge production continued at the same operating parameters as in FIG. 5A until a sufficient amount accumulated prompting the next collection.

Specific changes were made to the thickening unit 300 under test to improve performance. The dead space in the basin 315 was reduced with water-filled ziplock bags. Other fillers can also be used to reduce dead spaces. In other implementations, the design of the separation chamber or basin 315 can be adjusted to remove potential dead spaces. A horizontal collection port was converted to the standpipe weir 342 to collect the top layer of supernatant water. A rigid scrapper was added to one end of the conveying belt 309 to remove the accumulated sludge from the conveying belt 309. An edge of the scrapper can be positioned across the belt 309 to scrap off sludge to avoid buildup. A dam 345 was added to partition the collection area from the rest of the separation chamber or basin 315 prevented supernatant water from resuspending the sludge. In addition, one or both of the electrodes 306 can be tilted in the longitudinal axis (e.g., in a range from 1 to 5 degrees) to facilitate escape of the bubbles formed at the anode 306a. For example, a two degree tilt in the longitudinal axis of the electrode frame was added.

Figure 6A:
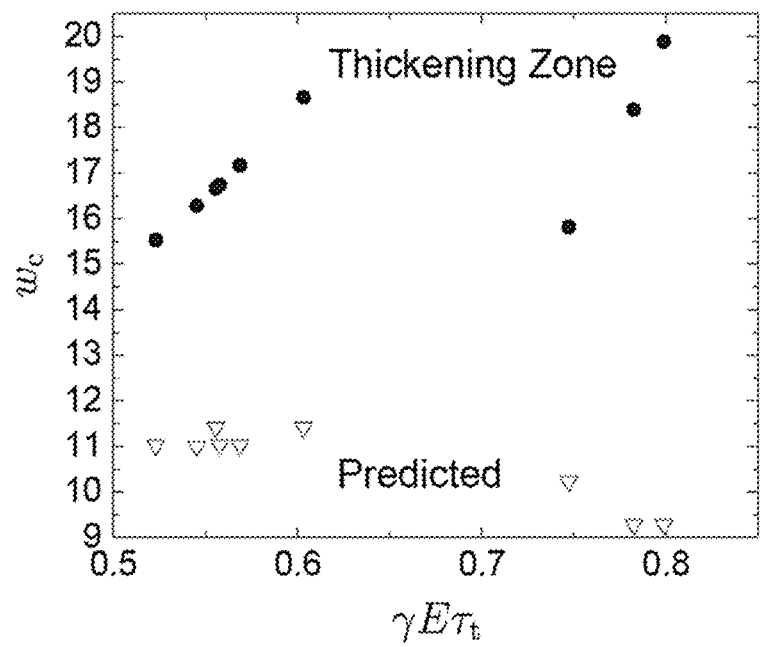
FIGS. 6A-6D illustrate test results of the thickening unit of FIG. 3, in accordance with various embodiments of the present disclosure.
Figure 6B:
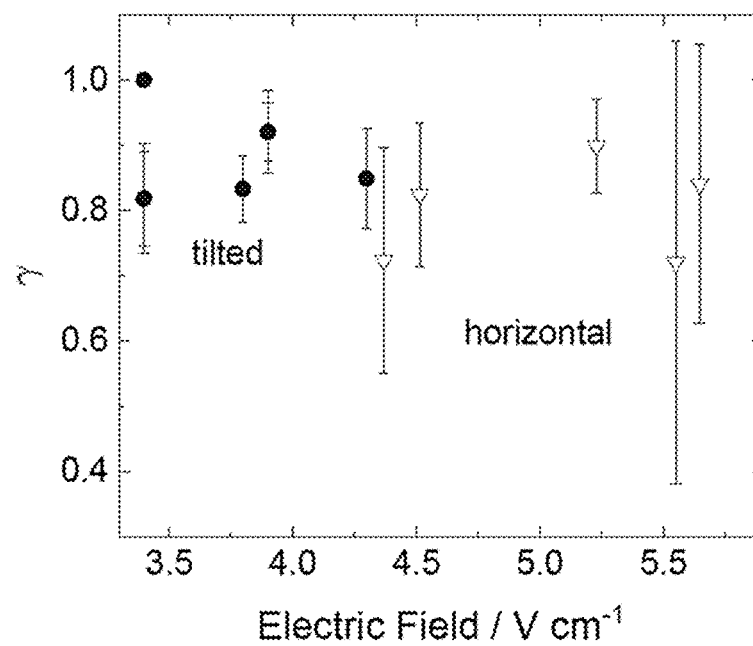

The thickening unit 300 was able to produce sludge up to a solids content of 20 wt %. FIG. 6A illustrates the thickening unit final solids content (circles) and predicted solids content (triangles), calculated using the constitutive relationship as a function of applied electric field and retention time from "A Constitutive Relationship for Electrokinetic Dewatering of Phosphatic Clay Slurries" by J. P. McKinney and M. E. Orazem (*Minerals & Metallurgical Processing*, 28 (2011) 49-54), which is hereby incorporated by reference in its entirety. As shown in FIG. 6A, the solids content obtained for a given applied electric field and retention time was substantially larger than that predicted by the constitutive relations. The retention time $\tau_t$ was calculated as:

$$\tau_t = \frac{V}{q_{in}}, \quad (1)$$

where V is the volume between the electrodes and $q_{in}$ is the feed volumetric flow rate. The fraction of active electrode surface area γ, estimated by:

$$\gamma = \frac{I}{I_{max}}, \quad (2)$$

which accounted for the electrode surface not blocked by bubbles formed by gas evolution. In equation (2), I is the steady-state current and $I_{max}$ is the maximum observed current. The electrode area covered by gas bubbles was smaller at lower potentials, due to reduced gas evolution, and was reduced by tilting the electrode assembly, as shown in FIG. 6B which is a plot of the average γ as a function of the electric field. When the anode was horizontal, the values of γ (triangle) were higher due to bubble accumulation beneath the belt. By tilting the conveyor frame, the values of γ (circle) were less variable. The reduced variability may partially be attributed to operating at lower electric fields.

Figure 6C:
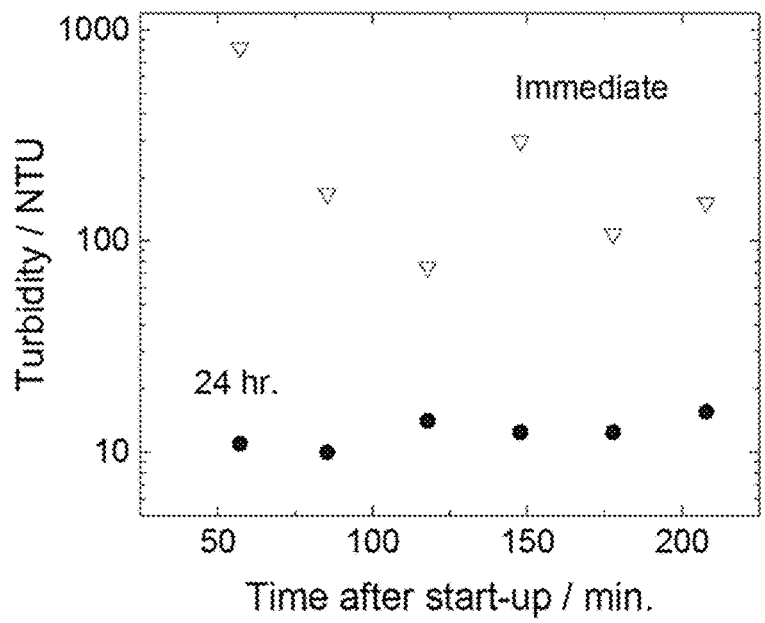

The supernatant water was collected using a standpipe overflow weir 342 (FIG. 3). Turbidity samples were collected after the initiation of the electric field. Within two hours, the turbidity of the water was less than 100 NTU. Mixing associated with gas evolution caused spikes in the turbidity measurements, as shown in FIG. 6C. Turbidity measurements for the supernatant water collected from the thickening unit 300 are plotted as a function of elapsed time. The samples were stored for 24 hours after which the turbidity was remeasured. The triangles are the measurement taken immediately after sampling and the circles are the measurements 24 hours after sampling. As observed with previous work, the supernatant water clarified further due to sedimentation.

Figure 6D:
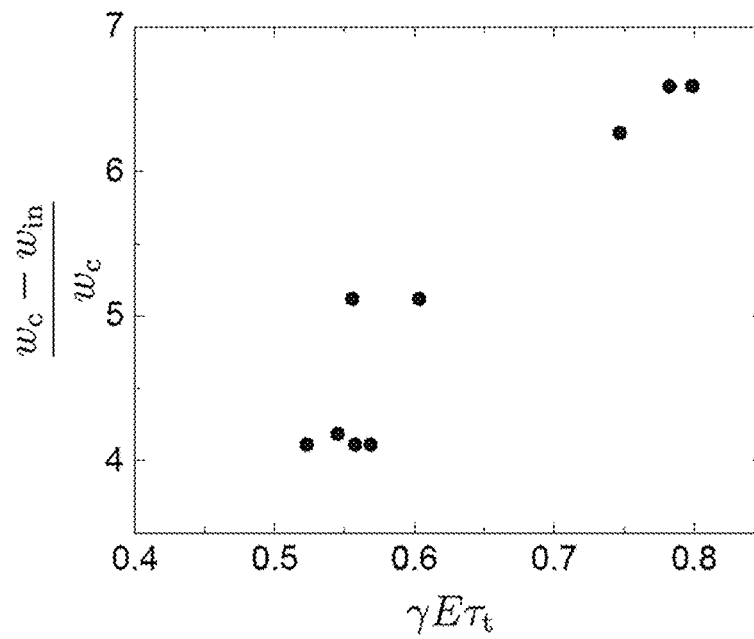

A model was developed to relate the sludge thickening to applied electric field, fraction of active electrode area, and retention time as $$\frac{w_c - w_{in}}{w_c} = \left(\frac{\rho \epsilon \epsilon_0 \zeta A}{\mu}\right) \gamma E \tau_t, \quad (3)$$

where $w_c$ is the solids content of the sludge, win is the initial solids content, E is the applied electric field, $\tau_t$ is the retention time and γ is the fraction of active electrode. Equation (3) includes supernatant water density ρ, dielectric constant ϵ, and viscosity μ. The electrode area is A, and the clay-particle zeta potential is ζ. After the electrodes were tilted to facilitate removal of gas bubbles, the average value of γ increased 10% from 0.80 to 0.88. The 10% increase in γ represents a 40% reduction in the area of the electrodes blocked by bubbles. FIG. 6D illustrates the change in solids content divided by the final solids content as a function of product of the applied electric field, fraction of active electrode, and retention time represented by $\gamma E \tau_t$. The results presented in FIG. 6D have an approximately linear relationship between scaled thickening and the product $\gamma E \tau_t$, showing that the term in the parentheses in equation (3) may be considered constant.

Dewatering Unit

Figure 7:
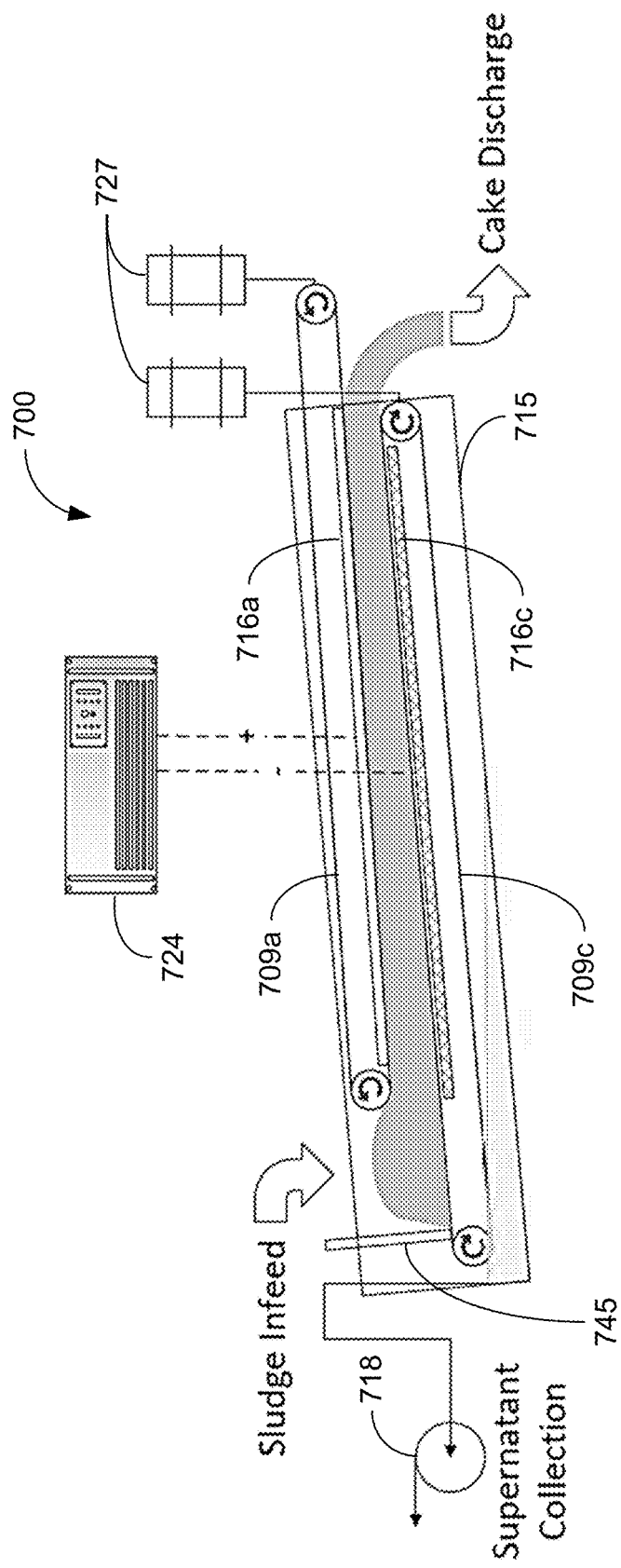
FIG. 7 is a graphical representation of an example of a cake dewatering unit, in accordance with various embodiments of the present disclosure.

The sludge output of the thickening unit 300 was fed into a cake dewatering unit implemented as a dual-belt feed-through continuous EKD unit. FIG. 7 is a graphical representation of an example of a cake dewatering unit 700. The thickened sludge and cake are feed between the electrodes 716 by upper and lower conveying belts 709. The sludge suspension is supplied to an inlet end of the conveying belts 709, where two nylon-mesh belts 709 surrounding the electrodes 716 sandwich the clay as it is dewatered and allow for steady movement of the cake to the discharge. The upper conveying belt 709a is offset from the lower conveying belt 709c and a rear separator or weir 745 extends across the inlet end of the lower conveying belt 709c to allow the sludge to be fed between the belts 709 and prevent it from falling into the retaining tank 715 where the supernatant water is collected. As the sludge is deposited on the lower conveying belt 709c, the belts 709 can be driven forward by electric motors 727 (e.g., a stepper motor). The motors 727 can be controlled to coordinate the movement of the conveying belts 709 and the dewatered cake towards the discharge where the cake can be deposited in a collection bin or other receptacle.

The anode 716a and cathode 716c were both expanded metal meshes made of iridium-oxide coated titanium. The anode 716a and cathode 716c receive DC power from a power supply 724 such as, e.g., a potentiostat. The gap between the electrodes 716 was tapered from the inlet end at the sludge infeed to the outlet end at the cake discharge, ensuring adequate clay-electrode contact as the clay cake is moved through the dewatering unit 700. At the outlet end adjacent to the cake discharge, one or both ends of the electrodes 716 may not be fixed in position, but can be supported by a tensioner that applies a compression force on the clay cake. The tensioner allows for movement of the electrodes 716 while maintaining the compression force on the cake. The polarity of the electrodes 716 was reversed with the anode 716a located over the cathode 716c such that the supernatant water moved downward during dewatering. As the cake is moved between the electrodes 716, the supernatant water flows through the false-bottom cathode 716c, collects in the back of a retaining tank 715, and is removed by a pump 718 (e.g., a peristaltic pump) or other appropriate drainage system. This approach was found to reduce the rehydration of the clay by the supernatant water.

The conveying belts 709 encompass expanded metal mesh electrodes 716 with dimensions of 63.5 cm by 38.1 cm. The conveying belts 709 sandwich and transport the clay between the electrodes 706. The feed-side gap between the electrodes 716 was fixed at 6.23 cm. The collection-side end of the anode 716a may not be fixed, allowing a variable collection-side gap. A tensioner can be used to apply sufficient downward force on the anode 716a to ensure electrical contact with the clay suspension, while limiting the collection-side gap to a maximum height. For example, a maximum collection-side gap was 3.4 cm. The lower cathode 716c was an expanded metal mesh that allowed the removed water to drip away from the cake.

The entire assembly was inclined +1.5 degrees on the longitudinal axis and placed in an acrylic tank, which acted as the retaining tank 715 and was inclined +3 degrees in the longitudinal axis. The inclination of the assembly and retaining tank 715, as illustrated in FIG. 7, allowed the removed water to collect in the low side of the dewatering unit 700. The frame of the assembly was made of Delrin®. The collected water was pumped out using a peristaltic pump 718 at a rate of 60 to 80 mL/min. The conveying belts 709 were made of the same polyester mesh filter screen as described in the thickening unit 300 of FIG. 3. The belt rollers were driven by stepper motors 727 (Automation Technology Inc. model KL23H2100-35-4BM) with 60:1-reducing right-angle gearboxes (Onedrives PF30-60NM). The motors 727 were controlled by an arbitrary waveform generator (FeelTech FY3200S) and stepper-motor drivers (Marlon P. 138 Jones & Associates, model 32383 MS).

The electrodes 706 can be stationary with moving conveying belts 709 as shown in FIG. 7. In alternative embodiments, one or both of the electrodes can be configured to move. For example, the conveying belts 709 can include the anode 706a and/or cathode 706c. The electrodes 706 can be integrated in the conveying belts 709 allowing them to move with the cake as it is transported to the end of the dewatering unit 700. Flexible metal wires, mesh or plates can be incorporated into the materials of the conveying belts 709. In some implementations, the anode 706a and/or cathode 706c can be a flexible metal belt fabricated from, e.g., iridium oxide coated titanium, carbon steel, or other appropriate corrosion resistant metal. The electrode belt can be positioned within the conveying belt 709 such that it moves in a synchronized fashion adjacent to the portion of the conveying belt 709 adjacent to the cake. One or more drive motor (e.g., a stepper motor) can be used to control movement of the electrode belts, and one or more tensioners can be configured to maintain the electrode belts in contact with the conveying belts 709 with a compressive force to maintain good contact for dewatering the clay.

The dewatering unit 700 was typically operated at applied potentials of 15 to 20 V from a DC power supply 724. When the line resistance of 1.0Ω was taken into account, the working potential between the electrodes 716 ranged from 10.6 to 14.2 V. The feed-side gap of the electrodes 716 was set at a constant 6.2 cm. Since the gap between the electrodes 716 was tapered, the electric field increased as the cake progressed down the length of the dewatering unit 700. The feed-side electric field ranged from 1.7 to 2.3 V/cm and was dependent on the working potential. The electrode gap at the discharge ranged from 2.8 to 3.4 cm with an average of 3.4 cm and depended on the working potential, final solids content, and feed rate. The discharge-side electric field ranged from 3.4 to 5.2 V/cm and was a function of the working potential and cake thickness. The belt speed ranged from 0.38 to 0.8 cm/min, and the supernatant water collection rate ranged from 60 to 80 mL/min.

The reversal of the electrode polarities (placing the cathode 716c on the bottom) allowed gravity flow to facilitate the removal of supernatant water. The proof-of-concept for a false-bottom cathode was obtained on the bench-top dewatering cell and resulted in a cake with a solids content of 40 wt. The bench-top test was conducted using expanded-metal meshes for the top and bottom electrodes. The bottom electrode was covered with the nylon-fabric mesh used for the conveying belts 709 to contain the sludge. A potential difference was applied to the electrodes to maintain a constant 4 V/cm. As the clay dewatered, water moved through the false-bottom cathode. The anode was then constantly lowered to ensure electrical contact while the applied potential was reduced to maintain a constant electric field. After an elapsed time of 5 hours, a clay cake with a solids content of 40 wt % was recovered.

Figure 8A:
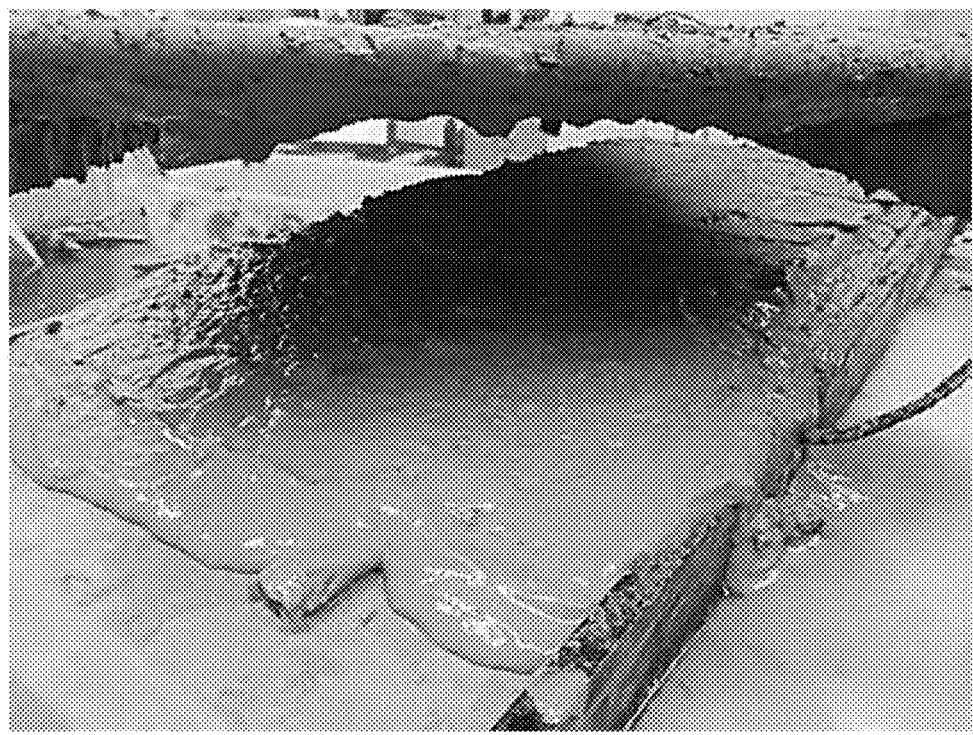
FIGS. 8A-8C are images of the dewatering unit 700 of FIG. 7 showing the transition of the clay from thickened sludge suspension to dewatered cake, in accordance with various embodiments of the present disclosure.
Figure 8B:

The configuration of the anode 716a was modified to improve dewatering. A tensioner was added to the anode 716a that utilized the belt tension to apply a compression force on the cake. It was found that without adequate compression, approximately the last quarter of the electrode area did not contact the clay. The tensioner improved contact and allowed dewatering along the entire length of the electrodes 716. FIGS. 8A and 8B are images of the dewatering unit 700 with the anode 716a and upper belt 709a removed to allow access to the cake. FIG. 8A is a view from the feed side of the dewatering unit 700 and FIG. 8B is a view from the discharge side, showing the transition of the clay from the sludge suspension to dewatered cake as it travels the length of the dewatering unit 700. The dewatering unit 700 was fed sludge with a solids content of 13 wt % and the feed-side electric field was 2.1 V/cm with a belt speed of 0.38 cm/min. The discharge-side electric field was 4.8 V/cm with the same belt speed.

Figure 8C:
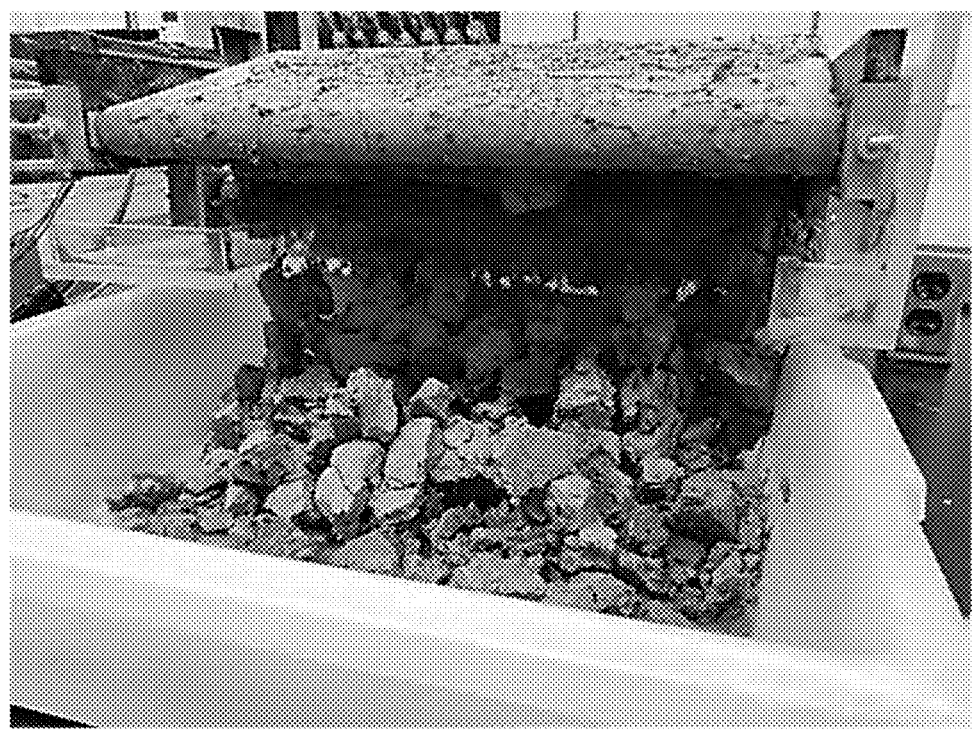

The dewatering unit 700 was able to produce a dewatered cake with a solids content up to 36 wt % at 3.2 kg/hr which corresponds to a dry-clay production rate of 1.2 kg/hr. A maximum wet-cake production of 6.5 kg/hr was observed. The turbidity of the supernatant water at steady-state was measured at 39 NTU. After 24 hours of settling, the turbidity measurement was reduced to less than 1 NTU. FIG. 8C is an image of the clay cake collected at the discharge of the dewatering unit 700.

A model was developed to relate the solids content in the dewatering unit as the clay traveled the length of the belt as:

$$\frac{w_c - w_{in}}{w_c} = \left(\frac{\rho \epsilon \epsilon_0 \zeta A}{\mu}\right) E_{eff} \tau_d, \quad (4)$$

which is analogous to equation (3). Since the electric field is not constant throughout the length of the belt, an effective electric field $E_{eff}$ was defined as:

$$E_{eff} = V_{eff}\left[\left(\frac{1}{d_{in}} - \frac{1}{d_{out}}\right)\frac{v_{belt}\tau_d}{2L} + \frac{1}{d_{in}}\right]. \quad (5)$$

The operational parameters are the applied potential difference $V_{eff}$, belt speed $v_{belt}$, and retention time $\tau_d$. The retention time in the dewatering unit was defined in terms of the length of the electrodes L and the belt speed as:

$$\tau_d = \frac{L}{v_{belt}}, \quad (6)$$

Figure 9:
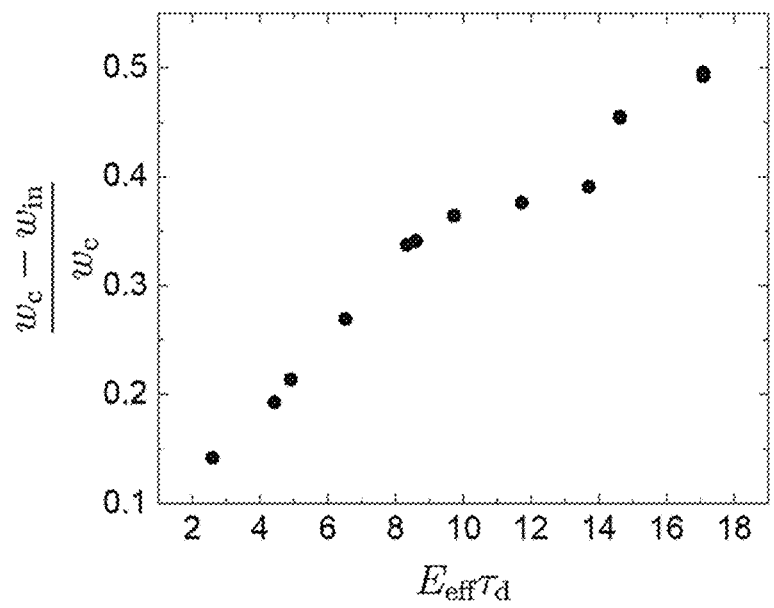
FIG. 9 illustrates test results of the dewatering unit of FIG. 7, in accordance with various embodiments of the present disclosure.

The feed-side electrode gap is given by $d_{in}$, and the discharge-side gap is given by $d_{out}$. If the electrode spacing does not taper, $d_{in}$ is equal to $d_{out}$, and the dewatering model in equation (4) simplifies to equation (3). When the change in solids content divided by the final solids content is plotted as a function of the effective electric field and retention time $E_{eff}\tau_d$ as shown in FIG. 9, a linear relationship was observed implying that the term in the parentheses in equations (3) and (4) was constant.

Stand-Alone Dewatering Unit

Figure 10:
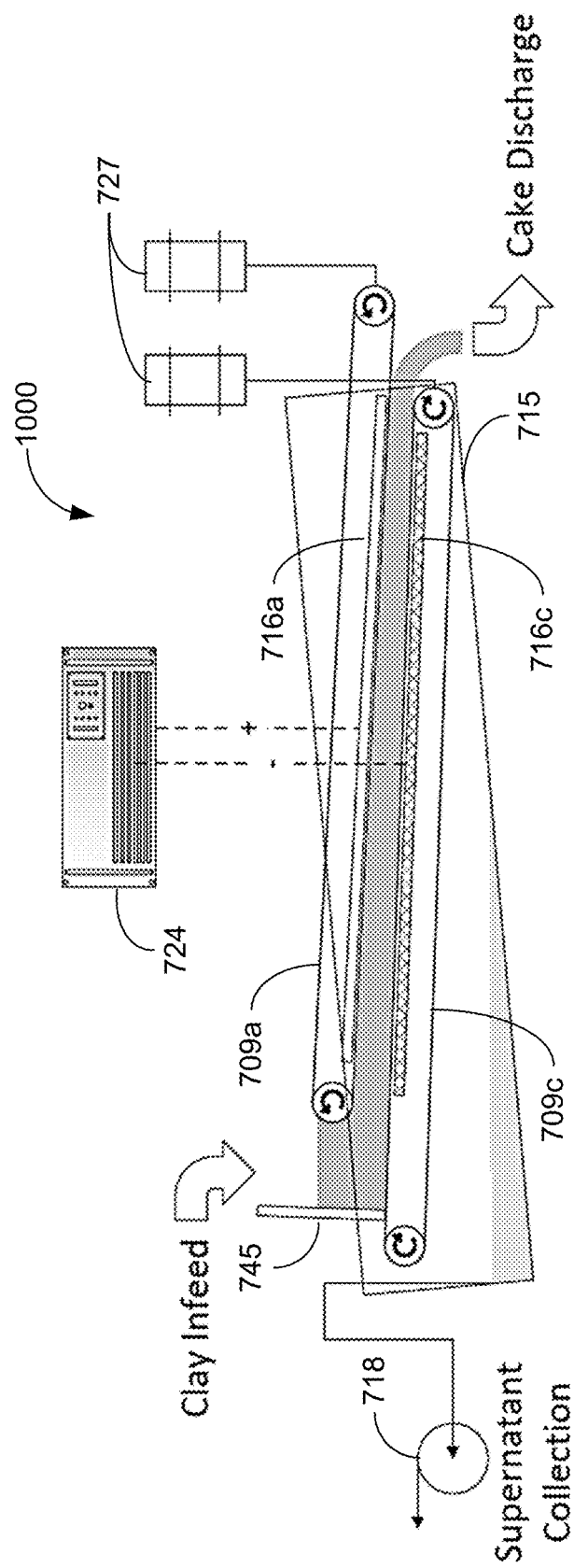
FIG. 10 is a graphical representation of an example of a stand-alone cake dewatering unit, in accordance with various embodiments of the present disclosure.

Experiments were performed to determine whether a stand-alone single-stage dewatering unit 1000 could provide adequate dewatering of an unthickened feed. The dewatering unit 700 of FIG. 7 was modified to accept a dilute sludge suspension feed that was not electrokinetically thickened. FIG. 10 is a graphical representation of an example of the stand-alone cake dewatering unit 1000. An initial concern of the operational mode was leakage of the unthickened clay suspension through the open area of the lower conveying belt 709c. In the design for the dewatering unit 700 of FIG. 7, the frame for the electrodes 716 and conveying belts 709, and the retaining tank 715 were inclined to facilitate the flow of supernatant water to the collection area of the retaining tank 715. In the stand-alone cake dewatering unit 1000 of FIG. 10, the assembly including the electrodes 716 and conveying belts 709 was declined (e.g., by −3 degrees) in the longitudinal axis while the incline of the retaining tank 715 was maintained. The assembly configuration was provided to ensure that the feed clay maintained electrical contact with the upper anode 716a. Other components of the stand-alone single-stage dewatering unit 1000 remained the same as those described for the dewatering unit 700 of FIG. 7.

The electrodes 706 can be stationary with moving conveying belts 709 as shown in FIG. 10. In alternative embodiments, one or both of the electrodes can be configured to move. For example, the conveying belts 709 can include the anode 706a and/or cathode 706c. The electrodes 706 can be integrated in the conveying belts 709 allowing them to move with the cake as it is transported to the end of the dewatering unit 700. Flexible metal wires, mesh or plates can be incorporated into the materials of the conveying belts 709. In some implementations, the anode 706a and/or cathode 706c can be a flexible metal belt fabricated from, e.g., iridium oxide coated titanium, carbon steel, or other appropriate corrosion resistant metal. The electrode belt can be positioned within the conveying belt 709 such that it moves in a synchronized fashion adjacent to the portion of the conveying belt 709 adjacent to the cake. One or more drive motor (e.g., a stepper motor) can be used to control movement of the electrode belts, and one or more tensioners can be configured to maintain the electrode belts in contact with the conveying belts 709 with a compressive force to maintain good contact for dewatering the sludge and cake.

Figure 11A:
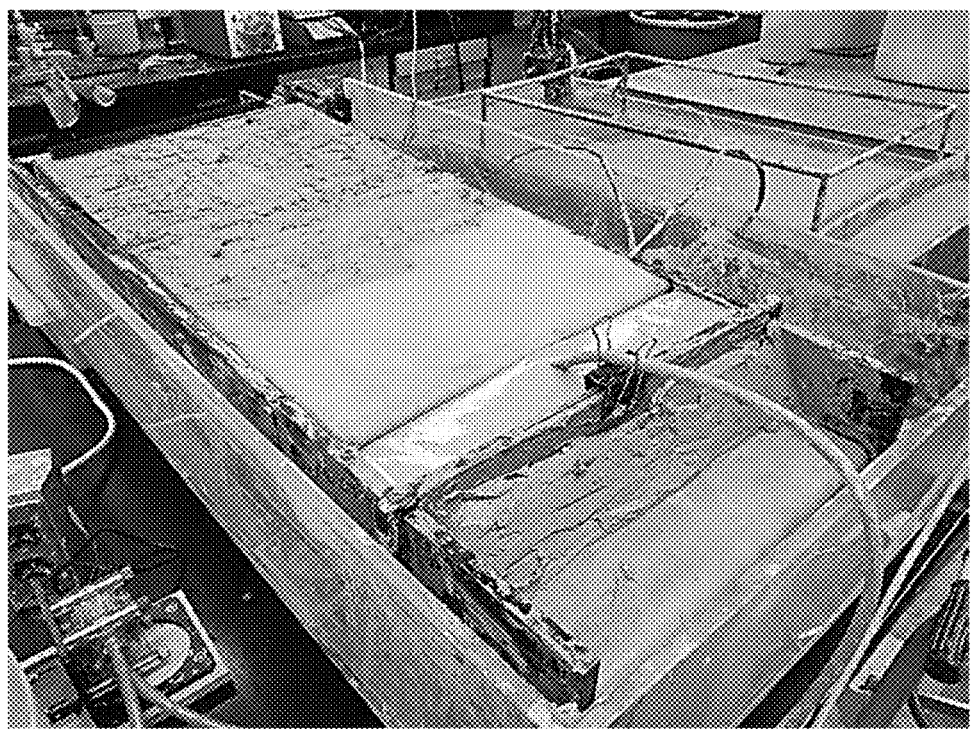
FIGS. 11A-11O are images of the stand-alone dewatering unit of FIG. 10 showing the transition of the clay from sludge suspension to dewatered cake, in accordance with various embodiments of the present disclosure.
Figure 11B:
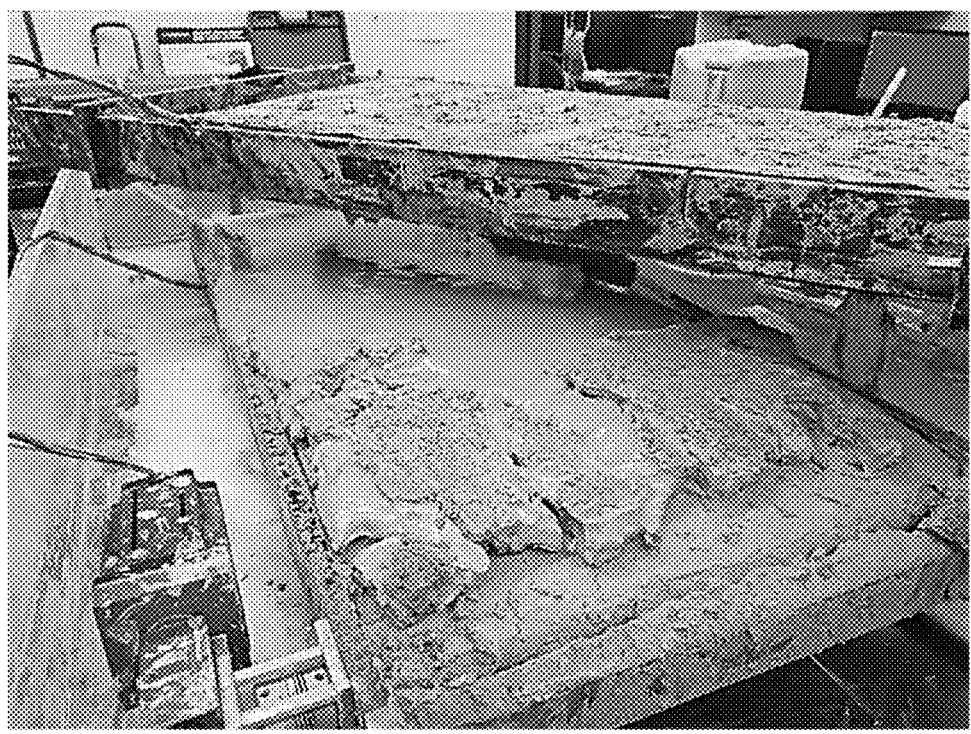

In the initial experimental runs, the dewatering unit 1000 was fed manually. Subsequent experimental runs used a pump to supply feed clay to the dewatering unit 1000. At startup, the dewatering unit 1000 can be manually fed a thickened clay with a solids content of at least 15 wt %. If the dewatering unit 1000 is started with unthickened clay with a lower solids content, the clay may flow freely over the conveyor belt 709c and fail to make electrical contact with the anode 706a, thereby hindering the formation of the dewatered cake. When the dewatering unit 1000 begins producing a dewatered cake, the feed can be switched to an unthickened clay suspension for dewatering. The dewatering unit 1000 can be fed using a pump such as, e.g., a peristaltic pump. FIGS. 11A and 11B show the stand-alone cake dewatering unit 1000 in operation and with the anode 706a and upper conveying belt 709a removed. The unit was operated under an effective potential of 15.4 V, a belt speed of 0.56 cm/min, and a volumetric feed rate of 130 mL/min. The feed section of the dewatering unit 1000 was sealed with dewatered clay to prevent leakage of the unthickened clay as shown in the image of FIG. 11A. The progressive dewatering as the clay travels down the unit can be seen in FIG. 11B. The fingers of low solids-content cake at the discharge was due to the clay sticking to the anode when the upper frame was removed.

Figure 11C:
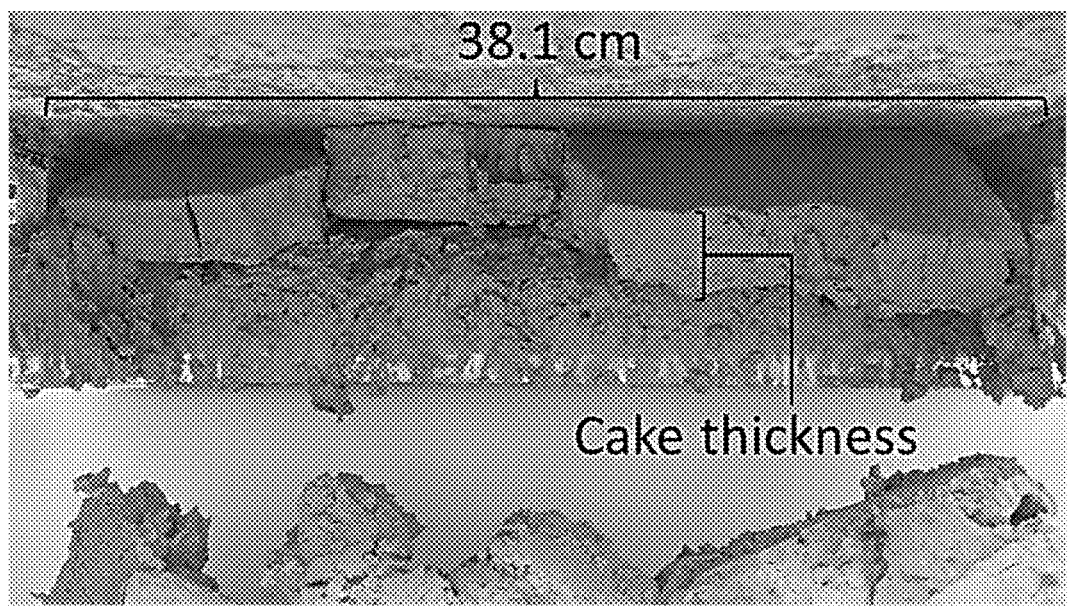

A typical operation in the stand-alone dewatering unit 1000 with unthickened feed produced cake with a final solids content that ranged from 31 to 38 wt % as pictured in FIG. 11C. The dewatered clay cake thickness was a function of the feed solids content, belt speed, and electric field. At the discharge, the dewatering unit 700 produced cake from the thickened sludge at an average thickness of 3.4 cm and the stand-alone dewatering unit 1000 produced cake from the dilute feed at an average thickness of 2 cm. The maximum observed wet-clay production rate was 3.6 kg/hr.

The applied potentials were increased, in comparison to the operation of the dewatering unit 700 of FIG. 7, to maintain effective dewatering and ranged from 17.5 to 22.5 V. The effective potential ranged from 12.6 to 16.5 V when the 1Ω line resistance was taken into account. In some cases, the applied potentials ranged from 20.0 to 27.0 V, which correspond to an effective cell potential of 15.7 to 20.9 V. The feed-side gap was maintained at 6.23 cm, which resulted in a feed-side electric field from 2.0 to 2.7 V/cm. Due to the lower solids-content of the feed suspension, the average cake thickness decreased to 2 cm resulting in a discharge-side electric field that ranged from 5.2 to 8.3 V/cm.

The turbidity of the supernatant fluid increased in comparison to the dewatering unit 700 of FIG. 7. The supernatant turbidity was measured at 1400 NTU. The larger turbidity may be attributed to leakage of feed suspension into the clarified water (e.g., through the lower conveying belt 709c. As with previous supernatant samples, the suspended clay in the supernatant settled within 24 hours, resulting in a measured turbidity of 1 NTU. The conversion of the suspension from a 10 wt % feed to a solid cake can be seen in FIG. 11B, showing the clay after the upper anode frame was removed. The fingers of low solids-content cake at the discharge may be attributed to clay sticking to the anode 716a when the upper frame was removed. The progressive dewatering as the clay traveled down the unit is evident.

Carbon Steel Electrodes

Figure 12:
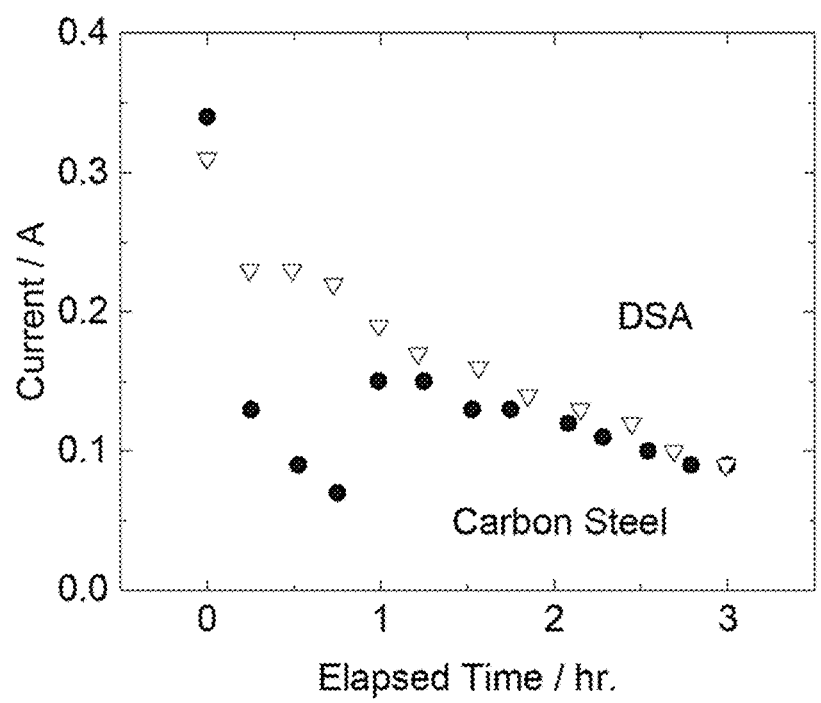
FIG. 12 illustrates test results of a carbon steel electrode, in accordance with various embodiments of the present disclosure.

Experiments with carbon steel serving as the cathode were completed for the purpose of cost reduction in electrode materials. Dimensionally stable anodes (DSA) made of titanium coated with iridium oxide had been utilized for both the cathode 706c/716c and anode 706a/716a. Benchtop EKD tests were performed utilizing a 1008 carbon-steel expanded-metal cathode on the cell. FIG. 12 illustrates the measured current on the bench-top cell at a constant electric field of 4 V/cm where the false-bottom cathode was DSA (triangle) and carbon steel (circles). The tests showed comparable currents resulted between the DSA and the carbon-steel cathodes at elapsed times greater than 1 hour, where the cell current is presented as a function of elapsed operation time.

A constant electric field of 4 V/cm was maintained in the bench-top test. The low current observed for the carbon-steel electrode during the first hour of operation may be attributed to the removal of the metal-oxide film on the cathode surface. After the film was removed in the first hour of operation, the operating current increased and was similar to the operating current of the DSA cathode. The resulting solids content for the carbon-steel cathode was 2 wt % lower than obtained using the DSA cathode. The reduction in final solids content may be attributed to the initial low current during the removal of the metal-oxide film. These experiments indicate that a carbon-steel cathode did not reduce EKD efficacy.

Economic Analysis

Figure 13A:
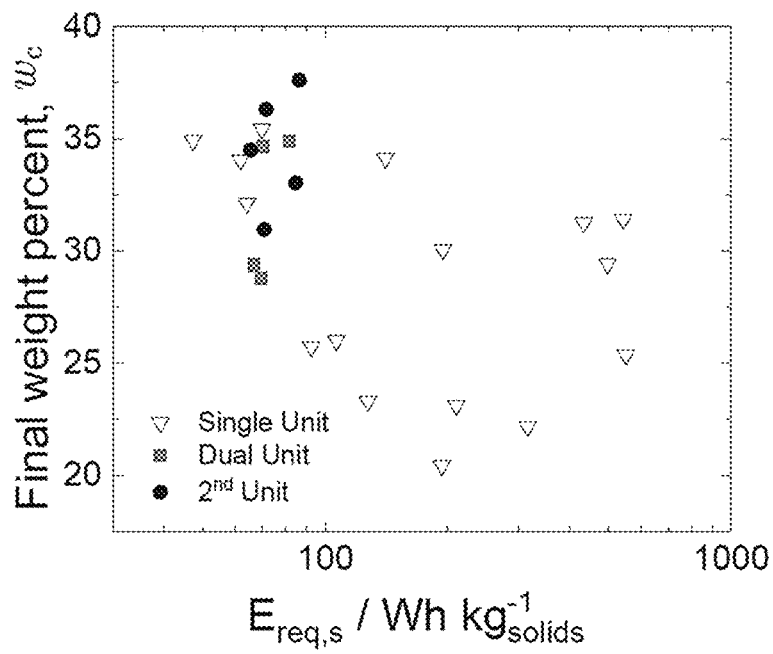
FIGS. 13A-13F illustrate economic comparisons between the continuous EKD system of FIG. 1, the dual-unit system including the thickening unit of FIG. 3 and dewatering unit of FIG. 7, and the stand-alone dewatering unit of FIG. 10, in accordance with various embodiments of the present disclosure.

The estimated total energy of the dewatering unit 700 of FIG. 7 and stand-alone dewatering unit 1000 of FIG. 10 were comparable to the energy used in the fully-continuous single-unit EDK system 100 of FIG. 1. The applied energy on a dry-clay basis $E_{req,s}$ can be calculated as:

$$E_{req,s} = \frac{IV_{eff}}{w_c m}. \quad (7)$$

where the average steady-state current is I, the working potential is $V_{eff}$, and mass production rate of wet-cake is m. The final solids content as a function of energy required on a dry solids basis for the single-unit EDK system 100 of FIG. 1 ("the single-unit" indicated by triangles), the suspension (or clay) thickening unit 300 of FIG. 3 and dewatering unit 700 of FIG. 7 system ("the dual-unit" indicated by squares), and the stand-alone dewatering unit 1000 of FIG. 10 ("the $2^{nd}$-unit" indicated by circles) are presented in FIG. 13A. The data reported and used for the economic analysis of the dual-unit and $2^{nd}$-unit designs is from experiments where the process was fully optimized which is 9 of the total 18 experiments.

Figure 13B:
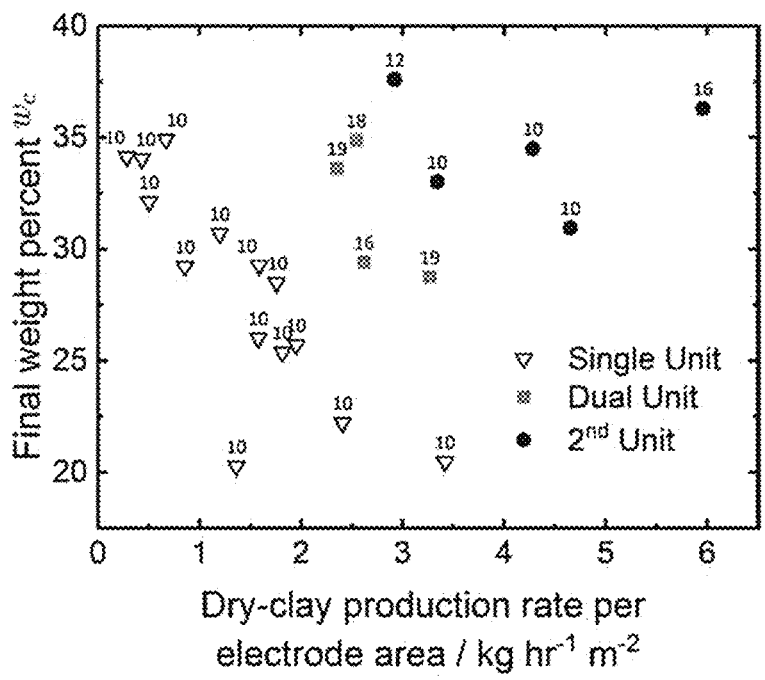

The dry-clay production rate of the designs are compared in FIG. 13B, which shows the dry-clay production rate per unit area of electrode as a function of the final solids content produced in the single-unit design (triangle), dual-unit (square) design, and $2^{nd}$-unit design (circle). Each data point is labeled with the feed solids content. The outlier in the 2nd-unit design data may be attributed to a high feed solids content. A linear decrease in final solids content was observed as the dry-clay production rate increased for all three designs. The dual-unit design showed that dry-clay production rate increased while maintaining high final solids content. At a solids content of 35 wt %, the production rate of the dual-unit increased approximately 5 fold when compared to the single-unit design. The $2^{nd}$-unit design had an approximate 8 fold increase in the production rate of cake with a solids content of 35 wt % when compared to the single-unit design.

A reduction of the capital costs of industrial EKD can be achieved by increasing the throughput. The capital cost to produce a ton of dry clay in $/tons dry solids, represented by $C_{cap}$, can be calculated by:

$$C_{cap} = \frac{A \times 1000 \frac{kg}{ton}}{w_c \times m \times 24 \frac{hour}{day} \times 365 \frac{day}{year}}, \quad (8)$$

where the annualized capital cost A is:

$$A = P \frac{i(1+i)^n}{(1+i)^n - 1}, \quad (9)$$

Figure 13C:
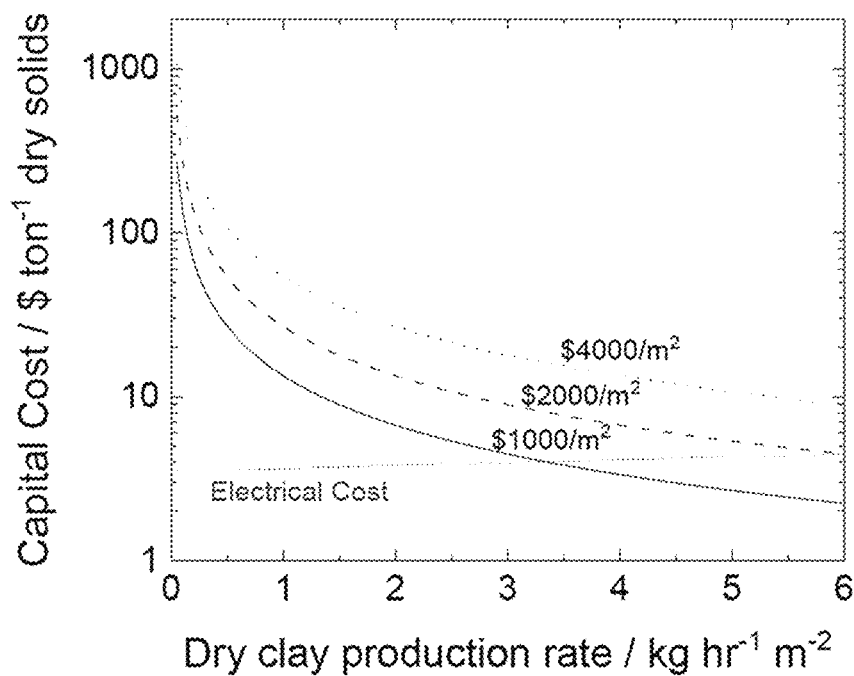

The capital cost was calculated assuming a 10% interest rate, represented by i, and a term of 20 years which is represented by n. The present value of the capital investment at installation is P in units of $/m². The decrease of capital cost with increasing the process throughput is shown in FIG. 13C, which illustrates the capital cost per ton of dry-clay as a function of dry-clay production rate per unit area with the present-value of the capital investment P as parameter. The electrical cost per ton of dry solids is estimated as a function of the dry-clay production rate and was fit using the $2^{nd}$-unit power consumption data.

The experiments with the carbon-steel cathode showed comparable performance when compared to the DSA. The cost of DSAs used in the bench-top experiments is on the order of 4,000 USD/m²; whereas the cost of expanded-mesh carbon-steel electrodes is on the order of 4 USD/m². The use of carbon-steel cathodes will reduce the capital cost of the dewatering unit.

The installation cost per unit area was estimated at $2000/m2. The cost of electricity was estimated at $0.062/kWh. The estimated electrical cost Cop required to process one metric ton of dry clay can therefore be calculated as:

$$C_{op} = E_{req,s} \times 1000 \frac{kg}{ton} \times \$0.062/kWh. \quad (10)$$

Figure 13D:
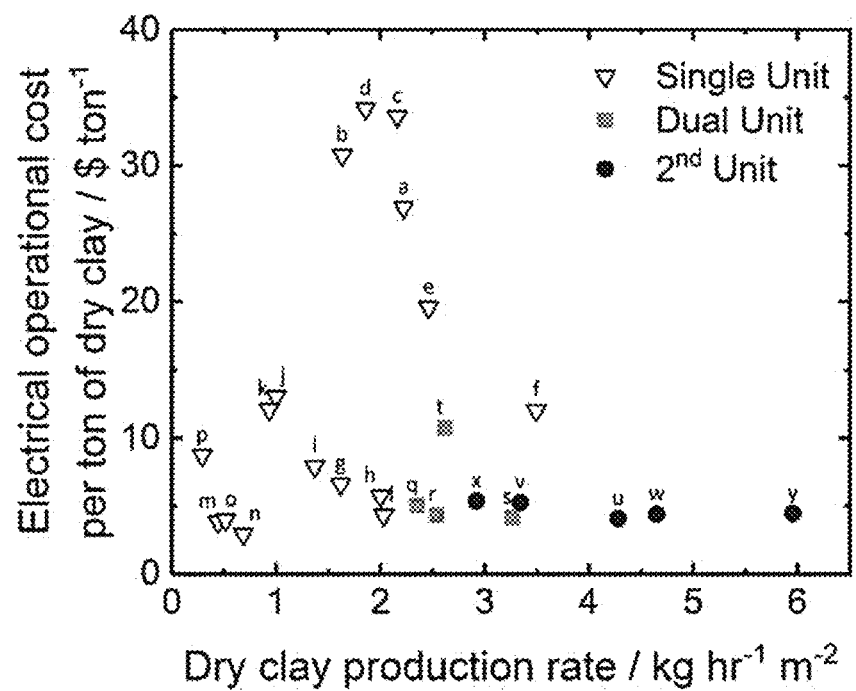

The primary cost of operation was assumed to be due to cost of electricity. As shown in FIG. 13D, a low electrical operational cost was maintained at the highest production rates in the latest design. The electrical operating cost was plotted as a function of dry-clay production rate per unit area of electrode of the single-unit design (triangle), dual-unit (square) design, and $2^{nd}$-unit design (circle) assuming an electrical cost of $0.062/kWh. Each data point is labeled with a letter index which refers to the operating conditions listed in the table in FIG. 13E, which shows the operating conditions, feed solids content, final solids content, and electric field, for each of experimental run. The electric field E presented is the electric field calculated from the effective potential and the feed-side electrode gap.

The total cost per ton of dry clay $C_{total}$ can be estimated by:

$$C_{total} = C_{cap} + C_{op}. \quad (11)$$

Figures 13E, 13F:
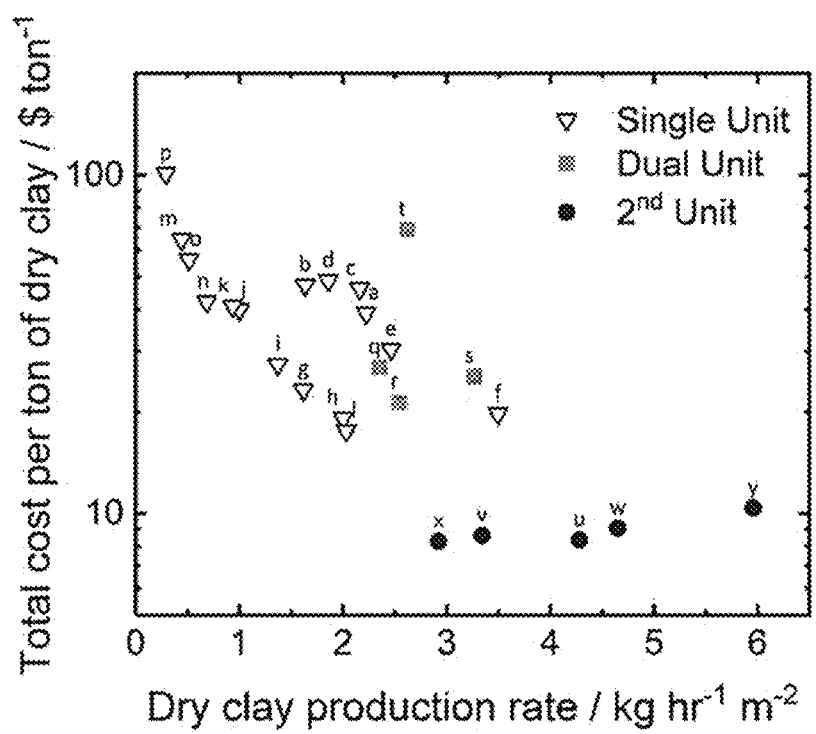

The total cost per ton of dry-clay is represented as function of dry-clay production rate per unit area of electrode in FIG. 13F. The total cost was plotted as a function of dry-clay production rate per unit area of electrode of the single-unit design (triangle), dual-unit (square) design, and 2nd-unit design (circle). The initial cost was estimated at $2000/m². The capital cost calculation assumed 10% interest over 20 years and an electrical cost of $0.062/kWh. Each data point is labeled with a letter index which refers to the operating conditions listed in the table in FIG. 13E. A substantial reduction in the total cost is projected with the $2^{nd}$-unit design, which is a result of increased throughput at high solids content, cheaper carbon-steel cathodes, and lower power consumption due to reduced electrode area. Under the assumed capital cost, the cost per metric ton of dry clay is projected to be on the order of $8-9/kg, with a solids content of 38 wt %.

The viability of industrial EKD has been demonstrated using the disclosed dewatering units. Utilizing a dual conveyor belt design increased throughput at high solids content. The largest dry clay production rate per unit area of electrode of the single-unit design was 3.4 kg/hr m² at a solids content of 20 wt %; whereas, the stand-alone dewatering unit produced 4.7 kg/hr m² at a solids content of 31 wt %. The stand-alone dewatering unit can produce cake with a 35 wt % solids content at a production rate of 4 kg/hr m² on a dry-clay basis; whereas the previous continuous EKD system with two zones could produce only 0.5 kg/hr m² on a dry-clay basis. This result represents an 8-fold reduction in the electrode area required. The economics were also improved by selecting a cheaper material for the cathode. Carbon-steel cathodes were demonstrated to yield performance comparable to that of more expensive cathodes made of iridium-oxide-coated titanium. The electrical-power required for the stand-alone dewatering unit was similar to that of the continuous EKD system. As a result, the estimated cost for continuous electrokinetic dewatering can be reduced by more than an order of magnitude. At an estimated capital cost of $2000/m² and an electrical cost of $0.062/kWh, the cost for dewatering is projected to be on the order of $8-9 per ton of dry clay produced. These costs do not include potential savings associated with obviating the need for construction of new clay settling areas.

The efficiency of the clay-water separation was improved by reversing the electrode polarity and by fabricating a false-bottom to facilitate removal of water. These changes yielded an increase of the maximum solids content from 35 wt % in the single unit to 38 wt % in the stand-alone dewatering unit. The increase in solids content was achieved using approximately the same amount of electrical power per dry-clay mass as in the single-unit design. The cost of electrode materials was reduced by almost 50% by demonstrating that an effective clay-water separation was achievable with a carbon-steel cathode. The design improvements yielded an 8 fold increase of the dry-clay production rate per unit area of electrode by resulting in the reduction of cost by a factor of 2-12, depending on the applied electric field.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for continuous electrokinetic dewatering, comprising:
a cake dewatering unit including:
an upper anode and a lower cathode extending at an inclined or declined angle across a dewatering chamber, where energizing the upper anode and the lower cathode establishes an electric field between the upper anode and the lower cathode;
a lower conveying belt extending from a first end to a second end across and within the dewatering chamber and around the lower cathode;
an upper conveying belt extending across at least a portion of the dewatering chamber and around the upper anode, the upper conveying belt offset from the first end of the lower conveying belt;
a sludge inlet that supplies a sludge suspension on the first end of the lower conveying belt, where rotation of the upper and lower conveying belts draws the sludge suspension between the upper anode and the lower cathode, where the sludge suspension is dewatered as it passes through the electric field between the upper anode and the lower cathode; and
a retaining dam positioned over the first end of the lower conveying belt, the retaining dam extending to at least a height of the upper conveying belt over the lower conveying belt, wherein the sludge suspension is provided by the sludge inlet between the retaining dam and the upper conveying belt.

2. The system of claim 1, wherein the upper anode and the lower cathode extend at a downward angle across the dewatering chamber.

3. The system of claim 1, wherein the upper anode is positioned above and substantially parallel to a lower portion of the upper conveying belt and the lower cathode is positioned below and substantially parallel to an upper portion of the lower conveying belt.

4. The system of claim 1, wherein the dewatering chamber extends at an upward inclined angle from the first side to the second end of the lower conveying belt.

5. The system of claim 1, wherein the upper and lower conveying belts discharge cake from the dewatering chamber after dewatering.

6. The system of claim 5, wherein the upper conveying belt extends beyond an end of the dewatering chamber.

7. The system of claim 1, wherein the retaining dam comprises thickened clay disposed on the lower conveying belt.

8. The system of claim 1, further comprising a power supply configured to energize the upper anode and the lower cathode.

9. A system for continuous electrokinetic dewatering, comprising:
a cake dewatering unit including:
an upper anode and a lower cathode extending at an inclined or declined angle across a dewatering chamber, where energizing the upper anode and the lower cathode establishes an electric field between the upper anode and the lower cathode;
a lower conveying belt extending from a first end to a second end across and within the dewatering chamber and around the lower cathode;
an upper conveying belt extending across at least a portion of the dewatering chamber and around the upper anode, the upper conveying belt offset from the first end of the lower conveying belt;

a sludge inlet that supplies a sludge suspension on the first end of the lower conveying belt, where rotation of the upper and lower conveying belts draws the sludge suspension between the upper anode and the lower cathode, where the sludge suspension is dewatered as it passes through the electric field between the upper anode and the lower cathode; and a suspension thickening unit including:
   an upper cathode and a lower anode extending across at least a portion of a thickening chamber, where energizing the upper cathode and the lower anode establishes an electric field between the upper cathode and the lower anode;
   a feed inlet configured to supply a dilute feed suspension comprising solids suspended in water to the suspension thickening zone;
   a solids conveying belt extending horizontally from an inlet side of the thickening chamber to an outlet side of the thickening chamber and around the lower anode, where the electric field between the upper cathode and the lower anode consolidates the solids away from the upper cathode and onto the solids conveying belt;
   a first discharge at the inlet side of the thickening chamber, the first discharge configured to remove supernatant liquid that collects over the upper cathode after separation from the dilute feed suspension in the electric field; and
   a second discharge at the outlet side of the thickening chamber, the second discharge configured to remove the sludge suspension from the thickening chamber.

10. The system of claim 9, wherein the feed inlet comprises an inlet nozzle configured to distribute the dilute feed suspension between the upper cathode and the lower anode.

11. The system of claim 9, further comprising a pump that supplies the dilute feed suspension to the feed inlet.

12. The system of claim 9, wherein the upper cathode is positioned adjacent to a surface of the dilute feed suspension in the thickening chamber, the upper cathode substantially parallel to the lower anode.

13. The system of claim 12, wherein the lower anode is positioned below and substantially parallel to an upper portion of the solids conveying belt.

14. The system of claim 9, further comprising a power supply configured to energize the upper anode and the lower cathode.

15. The system of claim 9, further comprising a power supply configured to energize the lower anode and the upper cathode.

16. The system of claim 15, wherein the power supply is further configured to energize the upper anode and the lower cathode.

17. A system for continuous electrokinetic dewatering, comprising:
   a cake dewatering unit including:
      a lower conveying belt extending at an inclined or declined angle from a first end to a second end across a dewatering chamber, the lower conveying belt comprising a lower cathode;
      an upper conveying belt extending over the lower conveying belt and across at least a portion of the dewatering chamber, a first end of the upper conveying belt offset from the first end of the lower conveying belt and a second end of the upper conveying belt extending beyond the second end of the lower conveying belt, the upper conveying belt comprising an upper anode, where energizing the upper anode and the lower cathode establishes an electric field between the upper anode and the lower cathode;
      a sludge inlet that supplies a sludge suspension on the first end of the lower conveying belt, where rotation of the upper and lower conveying belts draws the sludge suspension between the upper anode and the lower cathode, where the sludge suspension is dewatered as it passes through the electric field between the upper anode and the lower cathode, and discharges dewatered cake over the second end of the lower conveying belt below the second end of the upper conveying belt.

18. The system of claim 17, wherein the sludge suspension is supplied with a solids content of less than 15 wt %.

19. The system of claim 18, wherein the dewatered cake is discharged with a solids content in a range from about 31 wt % to about 38 wt %.

20. The system of claim 17, wherein a gap between the upper anode and the lower cathode is tapered to decrease from the first end of the upper conveying belt to the second end of the lower conveying belt.

* * * * *